2,991,555
NAVIGATIONAL COMPUTER
Olimpia Cambiaso, Via L.A. Vassallo 15–11, Genoa, Italy
Filed Sept. 15, 1959, Ser. No. 840,042
Claims priority, application Italy Feb. 11, 1959
7 Claims. (Cl. 33—1)

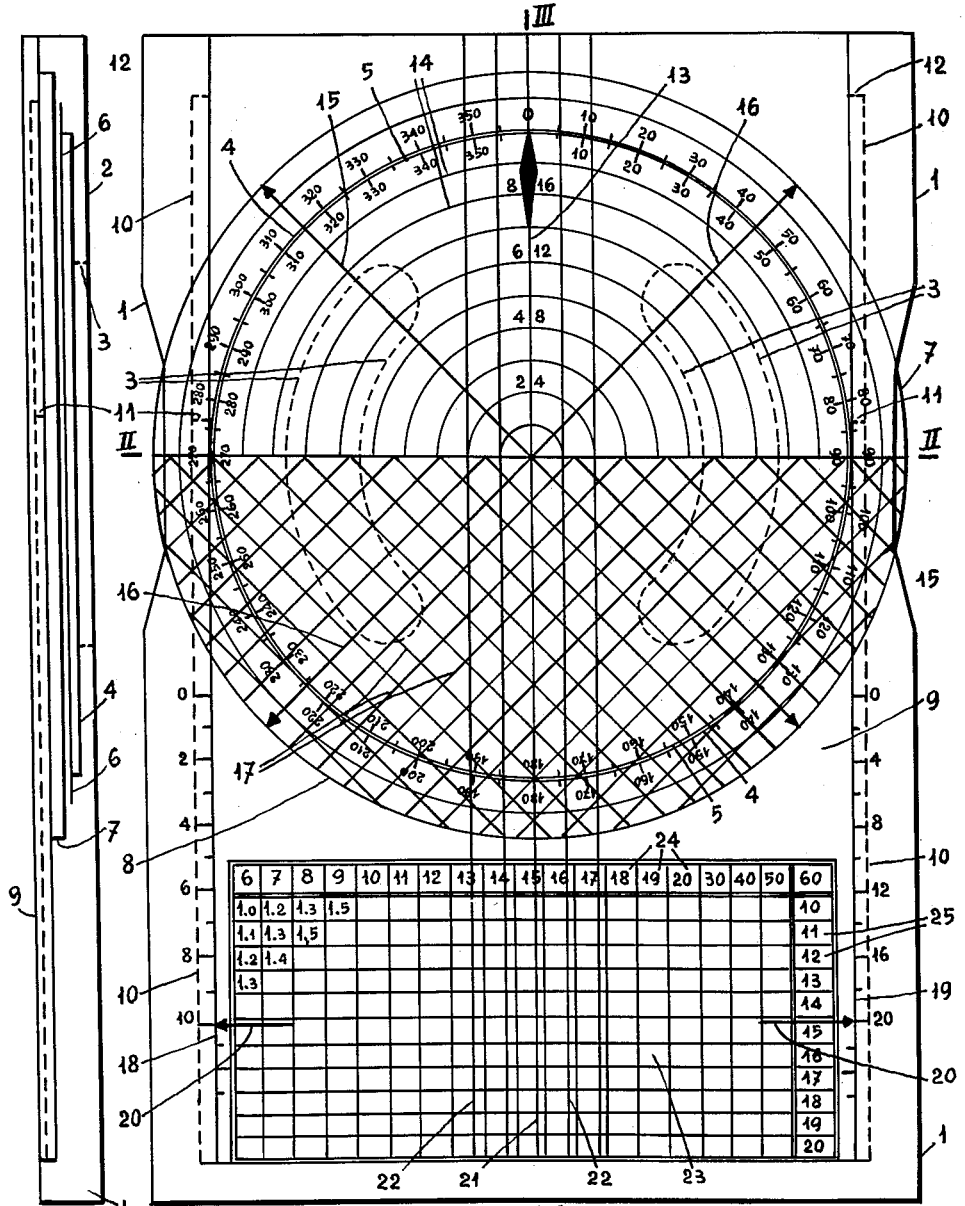

This invention relates generally to navigational aids and, more particularly, to a device for finding the true course and true speed of a vessel observed in the plan position indicator (P.P.I.) of a radar in another vessel.

While navigational aids are known for solving relative movement problems between vessels, as for example, maneuvering boards and plotting boards, still a navigational aid for quickly assisting a deck officer in solving the true course and true speed of a vessel observed from the relative course and speed shown on a plan position indicator of a radar system under restricted visibility conditions, is not known. It is quite evident that the navigational aids required for use with radar require many operations or a plotting team so that they are not used thereby causing the collisions happening between vessels equiped with radar.

It is a principal object of the present invention to provide a navigational aid by which a deck officer can quickly and simply determine the true course and speed of another vessel whose relative course and speed is observed by radar in a plan position indicator.

Other features and advantages of the apparatus in accordance iwth the present invention will be better understood as described in the following specification and appended claims in conjunction with the following drawings in which:

FIG. 1 is a plan view of a navigational aid or device according to the invention;

FIG. 2 is a sectional view taken along line 2—2 of FIG. 1; and

FIG. 3 is a longitudinal sectional view of the navigational aid taken along line 3—3 of FIG. 1.

According to the drawings the navigational aid or device, according to the invention, comprises a housing or case 1 having a bottom portion 2 provided with symmetrically disposed arcuate openings 3 in order to allow access to a rotatable lower disc 4 which is rotatably mounted in an annular recess 5 of case 1. The lower disc 4 is provided with compass markings dividing it into 360 degrees in known manner of compass graduations or markings. The lower disc 4 is preferably made of a white material, as for example, a white plastic material and can be readily rotated in its housing 5 by manually applying an upward pressure through the symmetrical openings 3 in the bottom of the case 1.

An upper transparent disc 7 is mounted coaxial with disc 4 and spaced therefrom by a thin and transparent diaphragm 6. A circular recess 8 in the case 1 holds the upper disc for rotation in the case. It being understood that access to the upper disc 7 and the viewing opening therefor are provided from the top of the case in the manner shown in FIG. 1. A transparent slidable member or plate 9 overlies the upper disc and is spaced therefrom being mounted for movement in the device in longitudinally extending guide recesses or notches 10 provided in the case 1. The plate or panel member 9 is provided with extensions 11 guided in guide notches 10 and engages the terminal ends or stops 12 of the notches limiting its longitudinal movement. The member 9 is preferably made of a material on which a grease pencil will write.

The case or housing 1 is provided with fixed compass markings disposed outwardly with respect to the lower disc 4. The upper disc 7 is provided with a marker line 13 usable for setting the radar bearings of the vessel observed in the plan position indicator of the radar. A series of range semi-circles 14 concentrically disposed and equally spaced are provided on the upper disc which is also marked with two pointers 15 and 16, corresponding to two course diameters of the disc normal to each other, for indicating the course of an observed vessel as later herein described.

A grid formed by equally spaced lines 17 normal to each other and at 45 degrees to line 13 covers one-half the surface of the upper disc as shown. The spacing between lines 17 is the same as between range semi-circles 14 and the grid includes half the pointers 15 and 16.

A short distance range scale 18 and a long distance scale 19 are disposed on opposite sides of case 1 having the range markings thereof extending in a longitudinal direction corresponding to the direction of movement of the sliding plate, which is provided with markers 20 cooperative with the distance scales to indicate distances as later herein described when using the device. The distance scale markings are preferably in two different colors. These colors and scale dimensions correspond with the colors and range scale markings of marker line 13 shown in the range semi-circles 14 of disc 7 on opposite side of line 13. Moreover, the scales have a two-to-one ratio as shown. The sliding plate is also provided with a center line or heading-line 21 which corresponds to a plane passing through the center of the two discs and corresponds to a plane passing through the "zero" and "180" degrees markings on the case. A plurality of lines 22 parallel to line 21 and spaced apart the distance between range semi-circles 14 are drawn in opposite sides thereof on the sliding plate 9 and are employed at later herein described.

A table 23 for computing the speed of a vessel observed is provided on the lower part of the case or housing 1 with vertical columns 24 marked off in intervals of time with the numerals thereof indicating time in minutes and horizontal columns 25 indicating the speed in knots per hour.

The apparatus is used as follows: The lower disc 4 is representative of a compass and must be oriented according to the course of the observer's vessel. Taking into consideration that the center line 21 of the sliding panel 9 corresponds to the heading of the observer's vessel, the lower disc 4 is angularly displaced so that heading line 21 indicates the course being followed by the observer's vessel as seen on the lower disc compass markings. The sliding plate 9 is then moved forward until the leading ends 11 engage stops 12 in which terminal position the pointers 20 correspond with the zero markings of the distance scales 18 and 19.

A bearing and range reading, as for example, a radar bearing and range is taken of the observed vessel and is plotted with a grease pencil on the sliding panel 9 using the marker line 13 of the upper disc as an alidade. It being understood that the plot is made with reference to the range semi-circles with the center of rotation of the discs being considered the position of the observer's vessel. The plot is made with reference to the range semi-circles taking into consideration the two distance scales and range markings corresponding to the two scales which are in different colors. At the time of the second radar bearing and range readings, the sliding panel 9 is displaced with respect to the distance scale zero reading, the proper distance corresponding to the distance covered by the observer's vessel during the interval of time between the two observations and the second position of the observed vessel is then again plotted on the sliding panel 9.

The two plots give the true position of the observed vessel with respect to the position of the observer's vessel and the distance between the plots is the true distance covered by the observed vessel during the interval of time between the two plotting operations. The direction of a line joining the first point or plot with the second one is the true course run by the observed vessel. The exact value can be easily found by rotating the upper disc until any of the grid lines, or one supposed parallel of them, pass through the two plotted points: The pointer corresponding to the direction of the series of plots will then indicate, on the lower disc, the true course of the observed vessel: The portion of grid-line lying between the two plots is the measure of the value of the true distance covered by the observed vessel during the interval. The speed per hour of the observed vessel is determined by entering the table 23 with the true distance covered and the interval of time.

It is understood that the bearings taken can be true bearings if taken from the true north, or relative bearings if taken from the bow of the observer's vessel. In the first instance the bearings will be read on the graduations or markings of the lower disc after having oriented it according to the course of the observer's vessel and in the second instance they are read on the fixed graduations or markings on the case radially outward of the lower disc. It will be understood that in making distance or range readings the same scale must be used throughout the solution of the problem.

According to the device, it is also possible to solve other navigational problems, as for example, the distance at which an observed obstacle is to be passed can be readily calculated by plotting the obstacle on the slide plate as heretofore described for plotting the position of an observed vessel, then rotating the upper disc for a course pointer to tally with the heading line 21, of the slide plate. The grid line normal to the pointer and passing through the plotted obstacle position indicates by the length between the pointer and the plotted position the distance sought. The course that must be taken in order to pass at any desired distance from an obstacle is obtained by plotting the obstacle on the slide plate as heretofore described, then rotating the upper disc until a grid line normal to a course pointer passes through the plot, the portion of the grid line between the course pointer and the plot is the required distance. The course pointer indicates the true course on the lower disc compass markings. The time required for arriving at a desired point or abreast of a desired point is obtained by plotting the point as described heretofore. Enter the time-distance-speed table with the known speed and the distance obtained by plot to read the time for covering the distance. Course changes in order to pass a safe distance from a vessel which is on a collision course with the observer's vessel is obtained by plotting two positions of the observed vessel as heretofore described. Then extending the line drawn between plots to intersect the heading line 21, the point of collision between vessels proceeding with unchanging bearings. The collision point is plotted on the slide plate and the upper disc rotated to bring a course pointer in the concentric circle half of the upper disc to pass through the intersection of a semi-circle passing through the plotted collision point and one of the lines 22 depending upon how far and in which direction the observed vessel is to be passed. The positioned course pointer will indicate the course to be steered on the lower disc compass marking for the indicated passing.

In addition to the above, the device can also easily solve other problems which may arise in radar navigation, such as, finding the course to be followed in order to reach a ship running on a known course and speed, and directing a vessel not equipped with the radar, or with the radar inoperative, towards a far-off ship running on a known course and speed.

While a preferred embodiment of the device, according to the invention, has been shown and described, it will be understood that many changes and modifications may be made within the scope of the invention.

What I claim and desire to secure by Letters Patent is:

1. A device for computing the true speed and course of a vessel observed from an observing vessel comprising, a pair of relatively rotatable, coaxial, superposed discs comprising a lower disc and an upper transparent disc, the lower disc having compass markings thereon divided into 360 degrees, a housing for mounting said two discs spaced for concentric, relative rotation having an opening for viewing the two discs and openings for allowing access to the two discs for rotating them relative to one another and to said housing, said housing having compass markings of 360 degrees disposed in fixed position peripherally of said lower disc and having a "0" degrees marking and a "180" degrees marking radially of a center about which said discs rotate and radially opposite each other, the upper disc having concentric range semi-circles equally spaced radially on half said disc, a radial line bisecting said range semi-circle and a first course pointer corresponding to a diameter of said upper disc and a second course pointer corresponding to a second diameter of the upper disc substantially at 90 degrees relative to the first diameter, the other half of the upper disc having a grid defined thereon by two sets of parallel lines perpendicular to each other and including respectively half of each course pointer, said grid lines spaced from each other an equal distance corresponding to the space between the range semi-circles, and thereby forming said grid of individual squares whose sides are equal, a transparent plate having a center line marking corresponding to a plane passing through the center about which the two discs rotate and passing through said "0" degrees and "180" degrees compass markings disposed radially of said housing, said housing having means mounting said transparent plate overlying the upper disc and spaced therefrom for movement in opposite directions corresponding to the directions in which said center line extends, at least one distance scale on said housing having distance indications disposed in a direction corresponding to the direction of movement of said transparent plate said distance indications being spaced equally apart the common distance of said grid spacing, and said plate having a marker normal to the direction of movement thereof for indicating movement of said plate relative to said scale, said distance scale indicating the distance covered by the observer's vessel during the interval of time between successive observations.

2. A device for computing the true speed and course of a vessel observed from an observing vessel comprising, a pair of relatively rotatable, coaxial, superposed discs comprising a lower disc and an upper transparent disc, the lower disc having compass markings thereon divided into 360 degrees, a housing for mounting said two discs spaced for concentric, relative rotation having an opening for viewing the two discs and openings for allowing access to the two discs for rotating them relative to one another and to said housing, said housing having compass markings of 360 degrees disposed in fixed positions peripherally of said lower disc and having a "0" degrees marking and a "180" degrees marking radially of a center about which said discs rotate and radially opposite each other, the upper disc having concentric range semi-circles equally spaced radially on half said disc a radial line bisecting said range semi-circles, and a first course pointer corresponding to a diameter of said upper disc and a second course pointer corresponding to a second diameter of the upper disc substantially at 90 degrees relative to the first diameter, the other half of said upper disc having a grid formed by two sets of parallel lines perpendicular to each other and each set including half of a course pointer, said grid lines spaced from each other an equal distance corresponding to the distance between said range semi-circles, thereby forming said grid of individual squares whose sides are equal, a transparent plate having a center line marking corresponding to a plane passing through the center about which the two discs rotate and passing through said "0" degrees and "180" degrees compass markings disposed radially of said housing, said center line marking having parallel line markings spaced from said center line marking, said housing having means mounting said transparent plate overlying the upper disc and spaced therefrom for movement in opposite directions corresponding to the directions in which said center lines extend, at least one distance scale on said housing having distance indications disposed in a direction corresponding to the direction of movement of said transparent plate and spaced apart the distance between said grid lines, said plate having a marker normal to the direction of movement thereof for indicating movement of said plate relative to said scale, said distance scale for setting the distance covered by the observer's vessel during the interval of time between successive observations and having a speed table on the lower part of the housing from which the speed of the observed vessel can be read once the distance travelled by it for a period of time is known.

3. A device for computing the true speed and course of a vessel observed from an observing vessel comprising, a pair of relatively rotatable, coaxial, superposed discs comprising a lower disc and an upper transparent disc, the lower disc having compass markings thereon divided into 360 degrees, a housing for mounting said two discs spaced for concentric, relative rotation having an opening for viewing the two discs and openings for allowing access to the two discs for rotating them relative to one another and to said housing, said housing having compass markings of 360 degrees disposed in fixed positions peripherally of said lower disc and having a "0" degrees marking and a "180" degrees marking radially of a center about which said discs rotate and radially opposite each other, one half of the upper disc having concentric range semi-circles with a common base diameter and equally spaced radially thereon and a first course pointer corresponding to a diameter of said upper disc and a second course pointer corresponding to a second diameter of the upper disc substantially at 90 degrees relative to the first diameter, the upper disc having a greater diameter than the lower disc and extending radially outwardly of said lower disc, the other half of said upper disc having a grid formed thereon by two sets of parallel lines, each said set respectively including half of a course pointer, and said parallel lines spaced from each other a distance equal to the spacing between said range semi-circles and with the lines of one set disposed at 90 degrees relative to the other set of lines to form said grid of individual squares whose sides are equal, a transparent plate having a center line marking corresponding to a plane passing through the center about which the two discs rotate and passing through said "0" degrees and "180" degrees compass markings disposed radially of said housing, said center line marking having parallel line markings disposed on both sides of the center line marking, said housing having means mounting said transparent plate overlying the upper disc and spaced therefrom for movement in opposite directions corresponding to the directions in which said center line extends, at least one distance scale on said housing having distance indications disposed in a direction corresponding to the direction of movement of said transparent plate, said distance scale being spaced and calibrated similarly to said range semi-circles, said plate having a marker normal to the direction of movement thereof for indicating movement of said plate relative to said scale, said distance scale for indicating in cooperation with the marker normal thereto, the distance covered by the observer's vessel during the interval of time between successive observations, and having a speed table on the lower part of the housing for determining the speed of the observed vessel once the distance travelled by it for a period of time is known.

4. A device according to claim 3, in which said slidable plate comprises a transparent material having a second marker thereon, said device having a second distance scale disposed with the markings thereof disposed along a longitudinal path corresponding to the direction of travel of said plate, said second marker being disposed to indicate markings on said second distance scale.

5. A device according to claim 3, in which said lines forming the grid on the upper disc are disposed at 45° relative to the base of said concentric range semicircles.

6. A device according to claim 3, in which said grid is disposed on one-half of said upper disc separate from said semi-circular range markings.

7. A device for computing the true speed and course of a vessel observed from an observing vessel comprising, a pair of relatively rotatable, coaxial, superposed discs comprising a lower disc and an upper transparent disc, the lower disc having compass markings thereon divided into 360 degrees, a housing for mounting said two discs spaced for concentric, relative rotation having an opening for viewing the two discs and openings for allowing access to the two discs for rotating them relative to one another and to said housing, said housing having compass markings of 360 degrees disposed in fixed positions peripherally of said lower disc and having a "0" degrees marking and a "180" degrees marking radially of a center about which said discs rotate and radially opposite each other, one half of the upper disc having concentric range semi-circles equally spaced radially thereon and a first course pointer corresponding to a diameter of said upper disc and a second course pointer corresponding to a second diameter of the upper disc substantially at 90 degrees relative to the first diameter, the upper disc having a greater diameter than the lower disc and extending radially outwardly of said lower disc, the other half of said upper disc having a grid formed thereon by two sets of parallel lines spaced from each other an equal distance with the lines of one set disposed at 90 degrees relative to the other set of lines to form said grid of individual squares whose sides are equal, said grid including half of the respective course positions, a transparent plate having a center line marking passing through the center about which the two discs rotate and corresponding to a plane passing through said "0" degrees and "180" degrees markings disposed radially of said housing, said housing having guide means mounting said transparent plate overlying the upper disc and spaced therefrom for movement in opposite directions corresponding to the directions in which said center line extends, at least one distance scale on said housing having distance indications disposed in a direction corresponding to the direction of movement of said transparent plate the distance in direction spaced and calibrated similarly to said range semi-circles, said plate having a marker normal to the direction of movement thereof for indicating movement of said plate relative to said scale, said distance scale corresponding to distance covered by the observer's vessel during the interval of time between successive observations, and having a speed table on the lower part in the housing for determining the speed of the observed vessel once the distance travelled by it for a period of time is known and said guide means being constructed to limit movement of said plate at a terminal position corresponding to a position in which said last mentioned marker on a said plate indicates to a zero marking on said distance scale.

References Cited in the file of this patent

UNITED STATES PATENTS

| | | |
|---|---|---|
| 2,546,836 | Saloschin | Mar. 27, 1951 |
| 2,813,338 | Meyers | Nov. 19, 1957 |
| 2,916,207 | Vohland | Dec. 8, 1959 |